US009264306B2

(12) United States Patent
Ciano et al.

(10) Patent No.: US 9,264,306 B2
(45) Date of Patent: Feb. 16, 2016

(54) DEPLOYMENT OF SOFTWARE IMAGES WITH RUN-TIME RECONNECTION

(71) Applicant: INTERNATIONAL BUSINESS MACHINES CORPORATION, Armonk, NY (US)

(72) Inventors: Giuseppe Ciano, Rome (IT); Claudio Marinelli, Aprilia (IT); Luigi Pichetti, Rome (IT); Maurizio Simeoni, Fiuggi (IT)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 14/052,845

(22) Filed: Oct. 14, 2013

(65) Prior Publication Data

US 2014/0143392 A1   May 22, 2014

(30) Foreign Application Priority Data

Nov. 21, 2012   (GB) .................................. 1220936.7

(51) Int. Cl.
*H04L 12/24* (2006.01)
*G06F 9/445* (2006.01)
*G06F 9/455* (2006.01)

(52) U.S. Cl.
CPC .............. *H04L 41/0813* (2013.01); *G06F 8/63* (2013.01); *G06F 9/44505* (2013.01)

(58) Field of Classification Search
CPC ..... G06F 8/63; G06F 9/44505; G06F 9/5072; G06F 9/4856; G06F 9/455; G06F 9/45558; G06F 9/468; G06F 17/30215; G06F 3/0607; G06F 11/1484; G06F 11/2033; G06F 2209/549; H04L 41/0813; H04L 67/10; H04L 67/1002; H04L 67/1008; H04L 67/1021; H04L 67/34; H04L 67/2814

USPC ......... 709/219, 213, 214, 216, 217, 223, 224, 709/227, 226, 229; 370/395.3, 401; 707/827, 831; 455/435.1, 436; 718/1
See application file for complete search history.

(56) References Cited

U.S. PATENT DOCUMENTS

2005/0199699 A1*   9/2005   Sato et al. .................... 235/375
2007/0050756 A1    3/2007   Paller
(Continued)

FOREIGN PATENT DOCUMENTS

WO    2011069782 A1    6/2011
WO    2012033485 A1    3/2012
WO    2012069296 A1    5/2012

OTHER PUBLICATIONS

Ciano et al. "Automate Virtual Machne Discovery and Self-Connectivity—Use Plug-and-Play to Discover and Connect Virtual Machines," Nov. 1, 2010.*

(Continued)

*Primary Examiner* — Alina N Boutah
(74) *Attorney, Agent, or Firm* — Law Office of Jim Boice

(57) ABSTRACT

A processor-implemented method, system, and/or computer program product deploys software images onto a computing system. A first computing machine is instantiated from a software image onto a computing system. The first computing machine has a first old access identifier, and is initially connected to a second computing machine in the computing system via a second old access identifier for the second computing machine. The second computing machine is reconfigured to have a new access identifier by: retrieving the new access identifier for said second computing machine, and associating the new access identifier with the second old access identifier; and redirecting each outbound communication, from the first old access identifier to the second old access identifier, to the new access identifier of the second computing machine.

20 Claims, 7 Drawing Sheets

(56) References Cited

U.S. PATENT DOCUMENTS

| | | |
|---|---|---|
| 2007/0078988 A1* | 4/2007 | Miloushev et al. ............ 709/227 |
| 2008/0215796 A1* | 9/2008 | Lam et al. ...................... 711/100 |
| 2009/0276771 A1* | 11/2009 | Nickolov et al. .............. 717/177 |
| 2010/0174811 A1* | 7/2010 | Musiri et al. .................. 709/223 |
| 2010/0235482 A1 | 9/2010 | Chalupa et al. |
| 2011/0004698 A1 | 1/2011 | Wu |
| 2011/0153697 A1* | 6/2011 | Nickolov et al. .............. 707/827 |
| 2011/0213884 A1* | 9/2011 | Ferris et al. ................... 709/226 |
| 2011/0219372 A1* | 9/2011 | Agrawal et al. ..................... 718/1 |
| 2011/0246748 A1* | 10/2011 | Talwar et al. .................... 712/30 |
| 2012/0054486 A1* | 3/2012 | Lakkavalli et al. ............ 713/156 |
| 2012/0054736 A1* | 3/2012 | Arcese et al. ................. 717/172 |
| 2012/0084768 A1* | 4/2012 | Ashok et al. .................. 717/174 |
| 2012/0131578 A1 | 5/2012 | Ciano et al. |
| 2013/0007727 A1 | 1/2013 | Donatelli et al. |
| 2013/0007854 A1* | 1/2013 | Sorenson et al. ................. 726/5 |
| 2013/0166724 A1* | 6/2013 | Bairavasundaram et al. 709/224 |
| 2013/0227699 A1* | 8/2013 | Barak et al. ...................... 726/26 |
| 2013/0263113 A1* | 10/2013 | Cavazza et al. ............... 717/178 |
| 2013/0276068 A1* | 10/2013 | Alwar ................................ 726/4 |
| 2014/0013323 A1* | 1/2014 | Devi .................................. 718/1 |
| 2014/0040446 A1* | 2/2014 | Cohen et al. ................... 709/223 |
| 2014/0041053 A1* | 2/2014 | Edwards et al. ................. 726/28 |
| 2014/0075435 A1* | 3/2014 | Assuncao et al. ................. 718/1 |
| 2015/0106810 A1* | 4/2015 | Ciano et al. ....................... 718/1 |

OTHER PUBLICATIONS

T. Chieu et al., "Simplifying Solution Deployment on a Cloud Through Composite Appliances", IEEE International Symposium on Parallel & Distributed Processing, Workshops, and PHD Forum, 2010, pp. 1-5.

GB Patent Application No. 1220936.7—UK IPO Search Report Mailed May 7, 2013.

GB Patent Application No. 1220936.7—UK IPO Document: Error in Search Report Mailed Jul. 19, 2013.

J. Matthews et al., "Virtual Machine Contracts for Datacenter and Cloud Computing Environments", ACM, Proceedings of the 1st Workshop on Automated Control for Datacenters and Clouds, 2009, pp. 1-6.

* cited by examiner

DEPLOYMENT OF SOFTWARE IMAGES WITH RUN-TIME RECONNECTION

This application is based on and claims the benefit of priority from United Kingdom (GB) Patent Application 1220936.7, filed on Nov. 21, 2012, and herein incorporated by reference in its entirety.

BACKGROUND

The solution according to one or more embodiments of the present invention relates to the data processing field. More specifically, this solution relates to the deployment of software images.

Deployment of software images is a commonplace activity in modern computing systems (for example, virtual data centers); generally speaking, a software image is a snapshot of a software structure that is installed on a mass memory of a computing machine. For example, software images are widely used in virtual appliances. A virtual appliance is a software appliance (i.e., a software solution for performing a specific user task being encapsulated in a pre-built, self-contained package), which is designed to run in a virtualized environment. For this purpose, the package of the virtual appliance (for example, conforming to the Open Virtualization Format, or OVF) comprises the definition of one or more virtual machines, or VMs (i.e., emulations by software of physical machines) and the corresponding software images, each one with one or more application programs (for implementing the software solution) and a Just Enough Operating System, or JeOS (i.e., a limited operating system specifically tailored to support the application programs). Virtual appliances allow provisioning the corresponding software solutions in a very simple and fast way; this is especially useful in cloud computing environments (wherein multiple services are provided on demand).

Each software image is built by preparing a (reference) computing machine with the installation of the required operating system and application programs in a building environment. The computing machine is then configured for testing its correct operation in the building environment. Typically, this involves the assignment at the operating system level of an access identifier to the computing machine (for example, a hostname); moreover, especially in case of large virtual appliances with a multi-tier structure wherein multiple virtual machines cooperate for implementing the software solution (for example, conforming to the Service Oriented Architecture, or SOA), this also involves the connection at the application program level to the access identifiers of other computing machines (for addressing outbound communications thereto). The software image of the computing machine is then captured and stored into a shared repository, from which it may be copied and instantiated into any desired target environment.

SUMMARY

A processor-implemented method, system, and/or computer program product deploys software images onto a computing system. A first computing machine is instantiated from a software image onto a computing system. The first computing machine has a first old access identifier, and is initially connected to a second computing machine in the computing system via a second old access identifier for the second computing machine. The second computing machine is reconfigured to have a new access identifier by: retrieving the new access identifier for said second computing machine, and associating the new access identifier with the second old access identifier; and redirecting each outbound communication, from the first old access identifier to the second old access identifier, to the new access identifier of the second computing machine.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
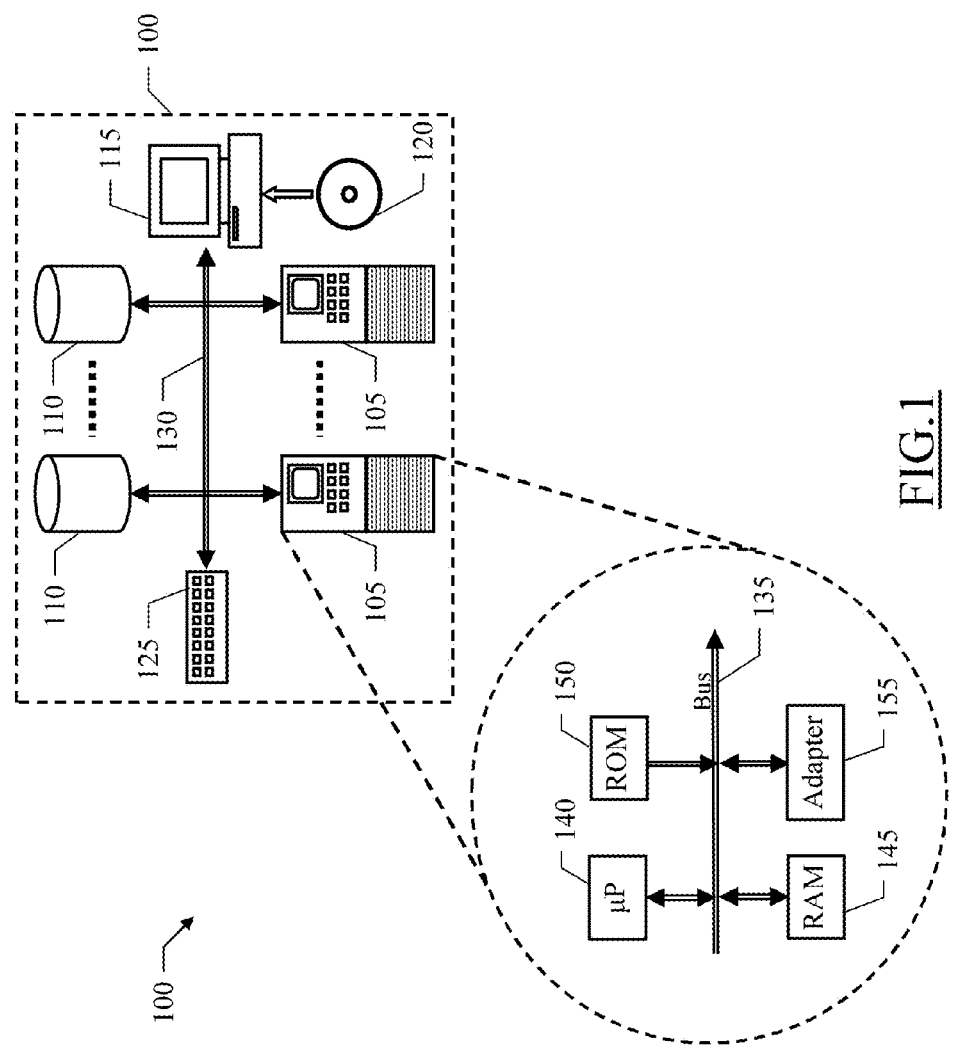
FIG. 1 shows a block diagram of a computing system that may be used to practice the solution according to an embodiment of the invention.

A problem of the deployment of software images is that the corresponding computing machines that are instantiated therefrom need to be reconfigured for working correctly in the target environment. Particularly, this involves the assignment of a new access identifier to the computing machine (at the operating system level) and the reconnection thereof to the other computing machines via their new access identifiers (at the application program level).

The technique commonly used for reconnecting each computing machine consists of introspecting the corresponding application programs to determine their connections to the other computing machines, and then updating the access identifiers thereof in their code accordingly. This operation is performed manually, or by invoking predefined scripts with static input values—for example, as described in "Simplifying Solution Deployment On A Cloud Through Composite Appliances, Parallel & Distributed Processing, Workshops and PhD Forum (IPDPSW), 2010 IEEE International Symposium, Trieu Chieu, Karve, A., Mohindra, A., Segal, A., T J. Watson Res. Center, IBM, Hawthorne, N.Y., USA". Moreover, other prior art describes the use of rules contained in each component defining how the component may be connected to other components. However, the above-described process is very tedious, time-consuming and prone to errors (especially for complex application programs).

A different technique in the prior art uses a stereo cable adapter, which is provided for each computing machine; for each connection involving the computing machine, the stereocable adapter comprises a socket section indicating configuration parameters required for establishing the connection and a plug section indicating configuration actions to be executed for this purpose. The computing machine is assigned a role in each connection thereof (i.e., a socket role when it is connected by other computing machines or a plug role when it connects to another computing machine). For each connection wherein the computing machine plays the socket role, a service connection engine processes its socket section by publishing the corresponding configuration parameters; for each connection wherein the computing machine plays the plug role, the service connection engine processes its plug section by retrieving the corresponding configuration parameters and executing the corresponding configuration actions passing these configuration parameters. In this way, the computing machines may connect one to another automatically in a plug and play way.

However, this technique as well requires a deep knowledge of the application programs for defining the connection actions to be executed on them.

In any case, sometimes it may be impractical to update the application programs for reconnecting the computing machines; this may happen when the application programs have an unknown structure (for example, in legacy application programs), or when the access identifiers embedded therein are not accessible from the outside (for example, because they are stored in encrypted form).

The solution according to one or more embodiments of the present invention is based in the idea of redirecting the outbound communications.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for deploying software images, wherein for each computing machine being instantiated from a corresponding software image (wherein it has an old access identifier and it is connected to the old access identifier of at least one further computing machine), each outbound communication to the old access identifier of each further computing machine is redirected to its new access identifier being retrieved from a manifested association thereof.

A further aspect of the solution according to an embodiment of the invention provides a corresponding computer program product.

A further aspect of the solution according to an embodiment of the invention provides a corresponding computer program product.

A further aspect of the solution according to an embodiment of the invention provides a corresponding system.

With reference now to the figures, and in particular to FIG. 1, a block diagram is shown of a computing system 100 that may be used to practice the solution according to an embodiment of the invention.

The computing system 100 (for example, a data center) is formed by a set of processing units 105 (for example, server computers of the rack or blade type) and a set of storage units 110 (for example, hard disks of the RAID type). The computing system 100 also comprises a console 115 for controlling the processing units 105 and the storage units 110 (for example, a personal computer, also provided with a drive for reading optical disks 120). A router (or switch) system 125 manages communications among the processing units 105, the storage units 110 and the console 115, and with the outside of the computing system 100 (for example, through the Internet); for this purposes, the processing units 105, the storage units 110, the console 115 and the router system 125 are connected through a cabling system 130.

A generic processing unit 105 is formed by several components that are connected in parallel to a bus system 135. In detail, a set of (one or more) microprocessors (μP) 140 controls operation of the processing unit 105; a RAM 145 is directly used as a working memory by the microprocessors 140, and a ROM 150 stores basic code for a bootstrap of the processing unit 105. Moreover, the processing unit 105 comprises a network adapter 155, which is used to connect the processing unit 105 to the cabling system 130.

An exemplary scenario of application of the solution according to an embodiment of the invention is shown in the FIG. 2A-FIG. 2D.

Figure 2A:
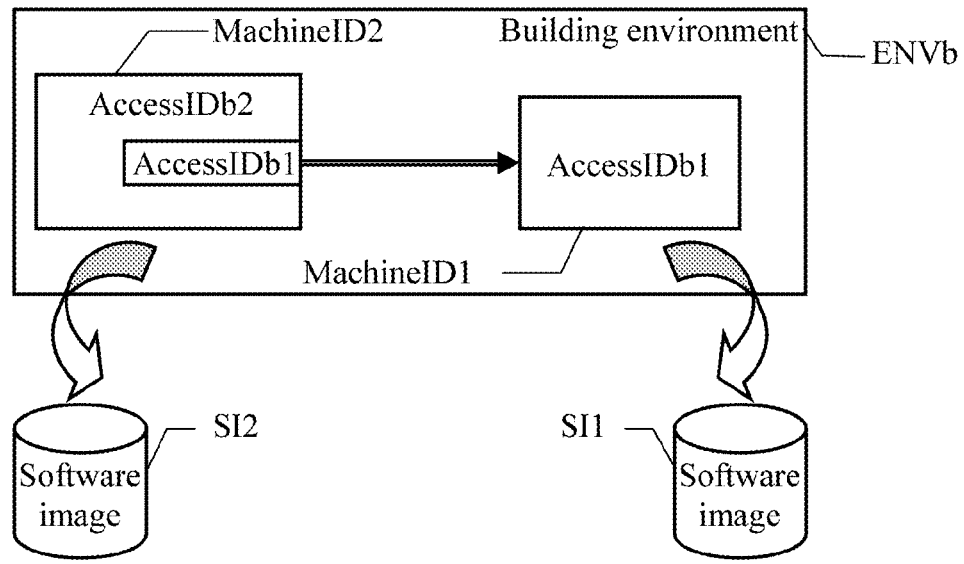
FIG. 2A-FIG. 2D show an exemplary scenario of application of the solution according to an embodiment of the invention.

Starting from the FIG. 2A, in a building environment ENVb of the above-described computing system (such as a segregated test network), a plurality of computing machines are provided—only two shown in the figure, each one logically identified by a corresponding machine identifier MachineID1 and MachineID2; for example, the computing machines MachineID1, MachineID2 are virtual machines of a virtual appliance. A set of software programs (not shown in the figure) is installed on each computing machine MachineID1, MachineID2; particularly, the software programs comprise an operative system (of the JeOS type) and one or more application programs running thereon. Each computing machine MachineID1 and MachineID2 is identified in the building environment ENVb for its actual access by a unique (old) access identifier AccessIDb1 and AccessIDb2, respectively (for example, a host name in a network domain thereof).

The computing machine MachineID2 is configured to connect to the access identifier AccessIDb1 of the computing machine MachineID1; a typical example is when the computing machine MachineID2 runs a client component of a software application (such as a monitoring application), which has a server component running on the computing machine MachineID1.

A software image SI1 and SI2 of the computing machine MachineID1 and MachineID2, respectively (i.e., a mass memory snapshot providing the definition thereof with the corresponding software programs, for example, packaged according to the OVF specification) is captured in the building environment ENVb.

Figure 2B:
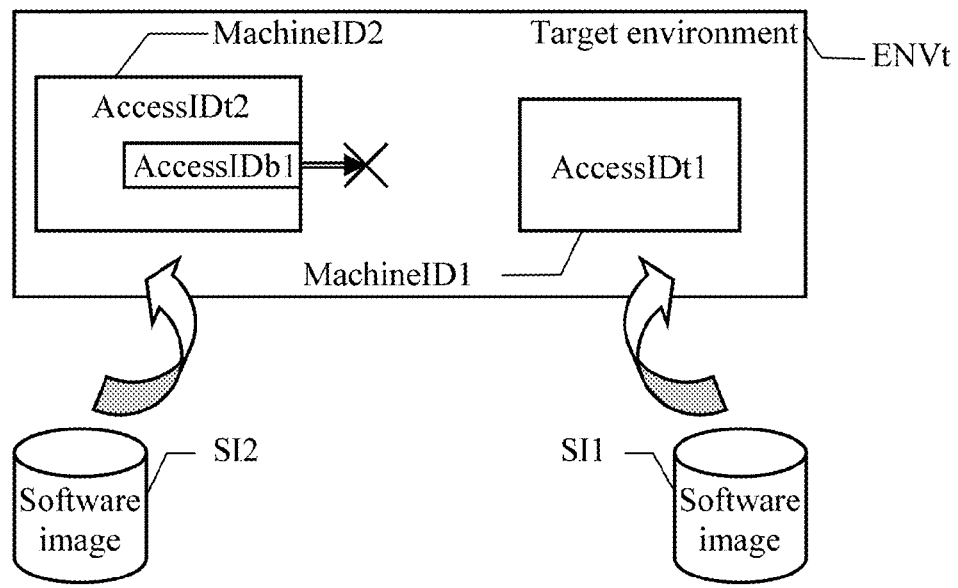

Moving to the FIG. 2B, the software images SI1 and SI2 are deployed onto a target environment ENVt (such as a production network implemented in the same or in a different computing system for access by remote clients). For this purpose, the same computing machines MachineID1 and MachineID2 are instantiated onto the target environment ENVt from the software images SI1 and SI2, respectively. The computing machines MachineID1 and MachineID2 are then reconfigured for working in the target environment ENVt. Particularly, each computing machine MachineID1 and MachineID2 is assigned a different (new) access identifier AccessIDt1 and AcceesIDt2, respectively.

In this condition, the computing machine MachineID2 would be unable to connect to the computing machine MachineID1, since its access identifier AccessIDb1 (stored in the computing machine MachineID2) does not exist in the target environment ENVt (or it may be assigned to another computing machine).

Figure 2C:
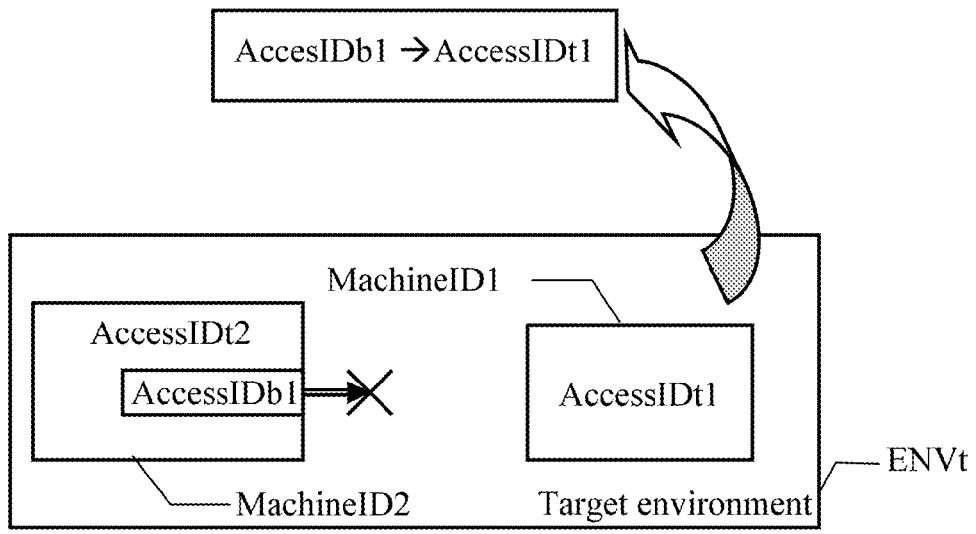

In the solution according to an embodiment of the invention, as shown in the FIG. 2C, an association between the access identifier AccessIDb1 and the access identifier AccessIDt1 of the computing machine MachineID1 is manifested (for example, with the computing machine MachinID1 that publishes it into a shared registry of the target environment ENVt).

Figure 2D:
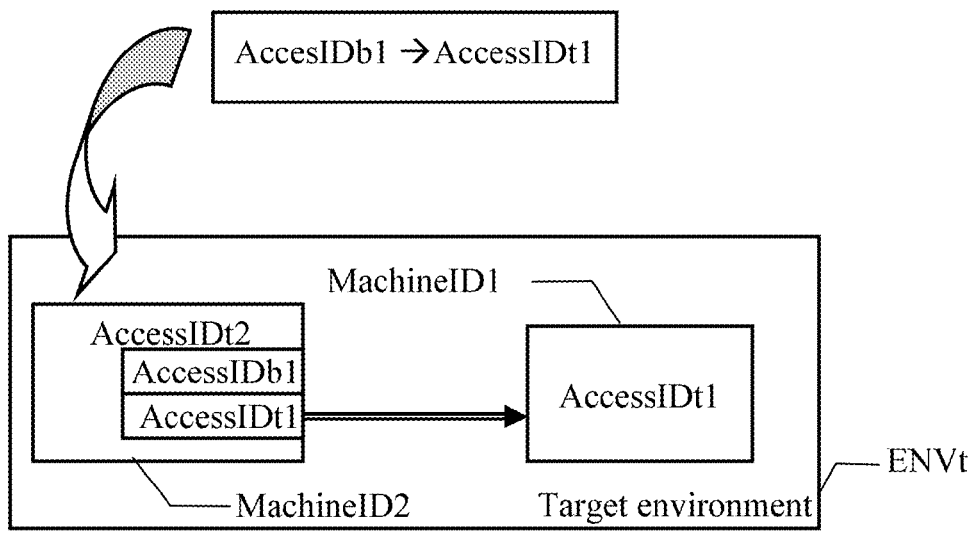

With reference now to the FIG. 2D, the computing machine MachineID2 retrieves the access identifier AccessIDt1 associated with the access identifier AccessIDb1 (from the shared registry in the example at issue). Each outbound communication from the computing machine MachineID2 to the access identifier AccessIDb1 of the computing machine MachineID1 is now redirected to its access identifier AccessIDt1, so that the computing machine MachineID2 is reconnected to the computing machine MachineID1 correctly.

The above-described solution allows reconnecting the computing machines automatically at run-time.

This solution is agnostic to the application programs, so that it is completely independent of their knowledge.

Therefore, the solution is of general applicability (for example, for application programs that have an unknown structure or when the access identifiers embedded therein are not accessible from the outside, such as because stored in encrypted form).

Figure 3:
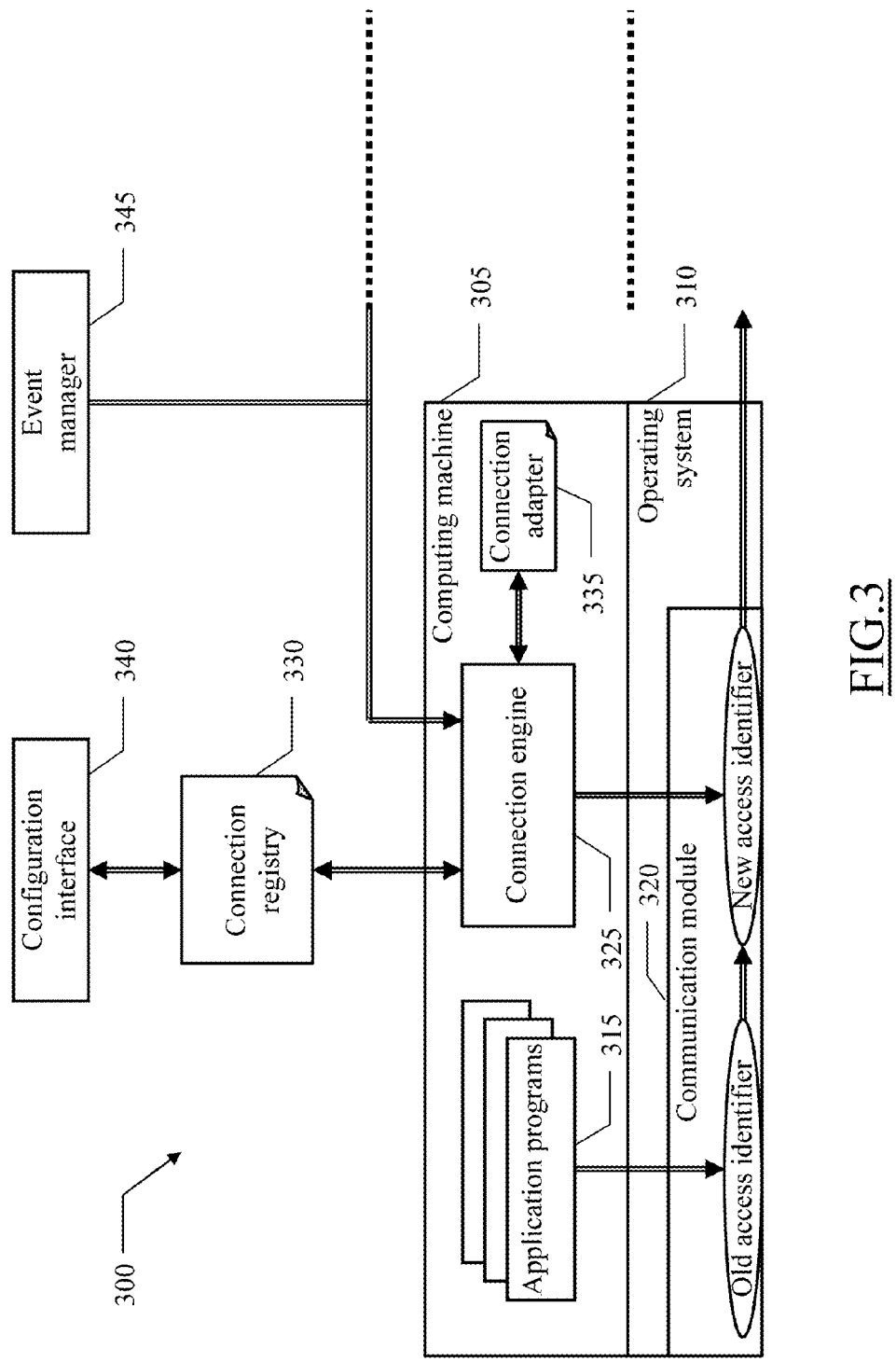
FIG. 3 shows the main software components that may be used to implement the solution according to an embodiment of the invention.

The main software components that may be used to implement the solution according to an embodiment of the invention are shown in the FIG. 3.

These software components are denoted as a whole with the reference 300. The information (programs and data) is typically stored in the storage units of the computing system and loaded (at least partially) into the working memories of its processing units when the programs are running. The programs are initially installed onto the storage units, for example, from optical disks.

Particularly, each computing machine (generically denoted with the reference 305) comprises its operating system (denoted with the reference 310) and one or more application programs running thereon (denoted with the reference 315); particularly, the operating system 310 has a (network) communication module 320 that controls all the communications of the computing machine 305 with the other computing machines (not shown in the figure).

The proposed implementation of the solution according to an embodiment of the invention is based on the technique described in the prior art. In this case, the computing machine 305 runs a connection engine 325, which manages its connections with the other computing machines.

For this purpose, the connection engine 325 accesses a connection registry 330 that is shared in the whole computing system (for example, provided by a dedicated computing machine operating as a deployment server). For each computing machine, the connection registry 330 stores an indication of the connections involving this computing machine. Particularly, for each connection the connection registry 330 indicates a role that is played by the computing machine in the connection and its actual status therein (for example, active or inactive). More specifically, the computing machine may have a socket role or a plug role (also simply indicated as socket or plug, respectively); a socket is a computing machine which one or more plugs may connect to, whereas a plug is a computing machine that may connect to a socket. Moreover, the connection registry 330 indicates the values of connection parameters that are published by the corresponding socket for enabling the connection thereto.

The connection engine 325 also accesses a connection adapter 335 (stored in the computing machine 305). The connection adapter 335 comprises a connection entry for each connection involving the computing machine 305. In turn, the connection entry comprises a socket section and a plug section for the computing machine playing the socket role or the plug role, respectively, in the connection; the socket section indicates the connection parameters to be published by the socket in the connection registry 330 for allowing the connections thereto by the corresponding plugs, whereas the plug section indicates connection actions to be executed by the plug for implementing the connection to the corresponding socket (according to the values of its connection parameters).

A configuration interface 340 (for example, running on the deployment server) is used by a system administrator to maintain the connections in the whole computing system; for this purpose, the configuration interface 340 allows the system administrator to view, add, update, remove or perform any other maintenance operation on the connection registry 330.

An event manager 345 (for example, running on the deployment server) detects any connection event relating to the management of the connections in the computing system. The event manager 345 communicates with the connection engine 325 of each computing machine 305 for notifying any connection event thereto, so as to trigger the execution of corresponding connection actions on the computing machine 305.

The above-described structure may be used to configure the connections among the computing machines in the building environment. For this purpose, the system administrator initializes the connection registry 330 by defining all the connections and the socket/plug of each one of them. The computing machines are then created into the building environment, and the connection engine 325 of each computing machine 305 is started. The connection engine 325 retrieves an indication of the connections involving the computing machine 305 and of the role played by it in each one of them from the connection registry 330. The connection engine 325 then downloads the connection adapter 335 with the connection entries corresponding to these connections onto the computing machine 305. For each connection wherein the computing machine 305 plays the socket role, the connection engine 325 determines the values of the corresponding connection parameters and publishes them into the connection registry 330; for each connection wherein the computing machine 305 plays the plug role, the connection engine 325 retrieves the values of the corresponding connection parameters from the connection registry 330 and then executes the corresponding connection actions passing these connection parameters.

In the solution according to an embodiment of the invention, the same structure is also used in a lightweight way to reconnect the computing machines in the target environment.

For this purpose, each connection entry of each connection adapter is simplified (so as to define a "UniversalCable" distinguishing from the "StereoCable" described in the prior art). Particularly, the connection parameters are simply the old access identifier and the new access identifier of the corresponding socket, whereas the connection actions are simply commands for adding/removing an internal alias for the old access identifier pointing to the new access identifier of the socket into the communication module 320.

The software image of each computing machine 305 suitably connected to the other computing machines in the building environment, comprising the above-described (simplified) connection engine 325 and connection adapter 335, is captured and stored into a software image repository (for example, via any known composition tool, not shown in the figure). Whenever a generic software image has to be deployed, the software image is retrieved from the software image repository and applied into the target environment (for example, via any known deployment tool, not shown in the figure); this causes the instantiation of the corresponding computing machine 305, which is then assigned its new access identifier for working in the target environment.

As above, for each connection wherein the computing machine 305 play the socket role, the connection engine 325 determines the values of the corresponding connection parameters (i.e., its old access identifier and new access identifier), and publishes them into the connection registry 330; for each connection wherein the computing machine 305 plays the plug role, the connection engine 325 retrieves the values of these connections parameters from the connection registry 330 (i.e., the new access identifier associated with the old access identifier of the corresponding socket), and then executes the corresponding connection action passing them (so as to add an internal alias for the old access identifier pointing to the new access identifier into the communication module 320).

In this way, the old access identifier may continue being used as a valid access identifier within the corresponding plug, but it is not visible outside it to avoid creating any conflict with its new access identifier.

Figure 4A:
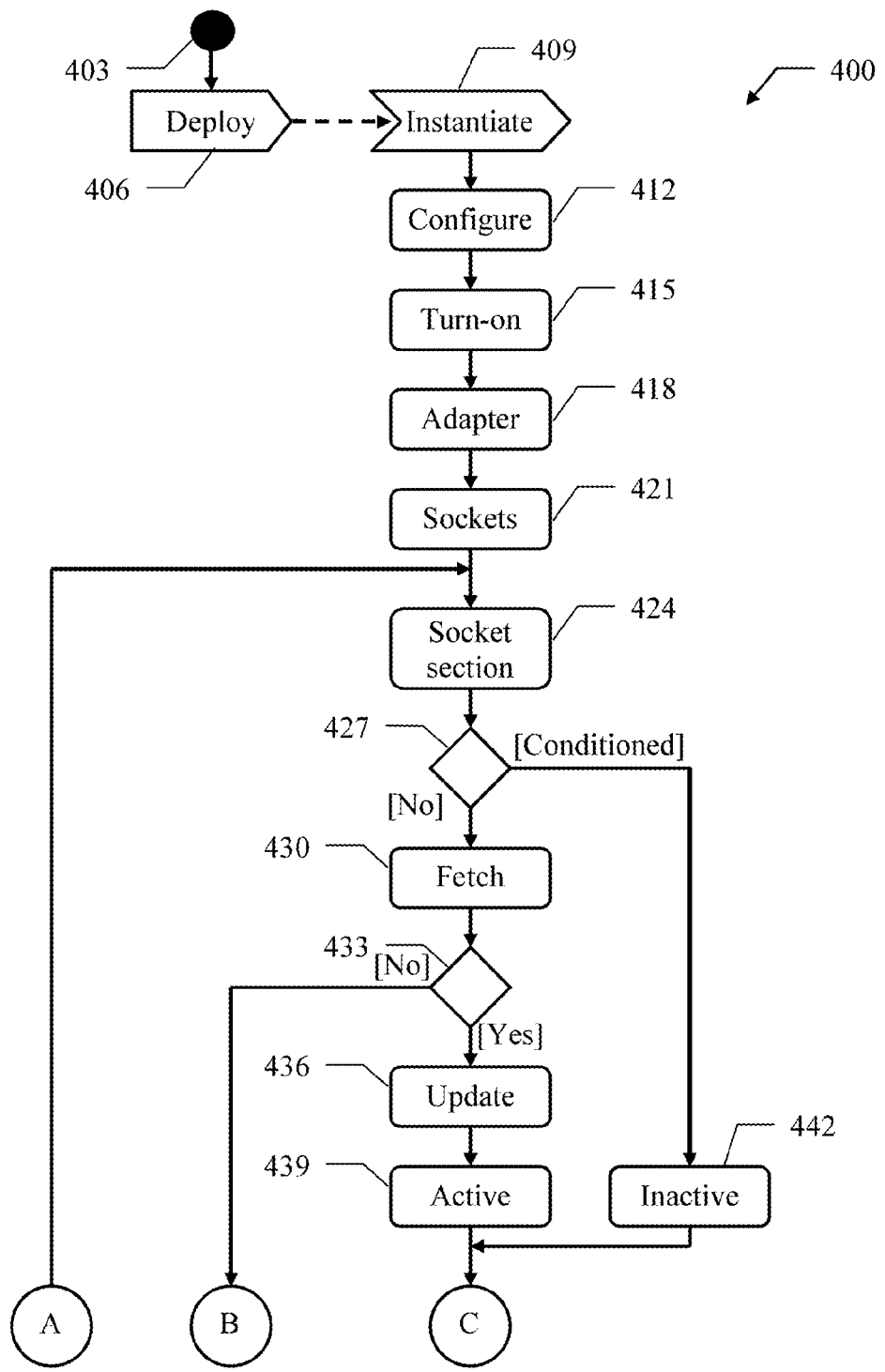
FIG. 4A-FIG. 4C show an activity diagram describing the flow of activities relating to an implementation of the solution according to an embodiment of the invention.
Figure 4B:
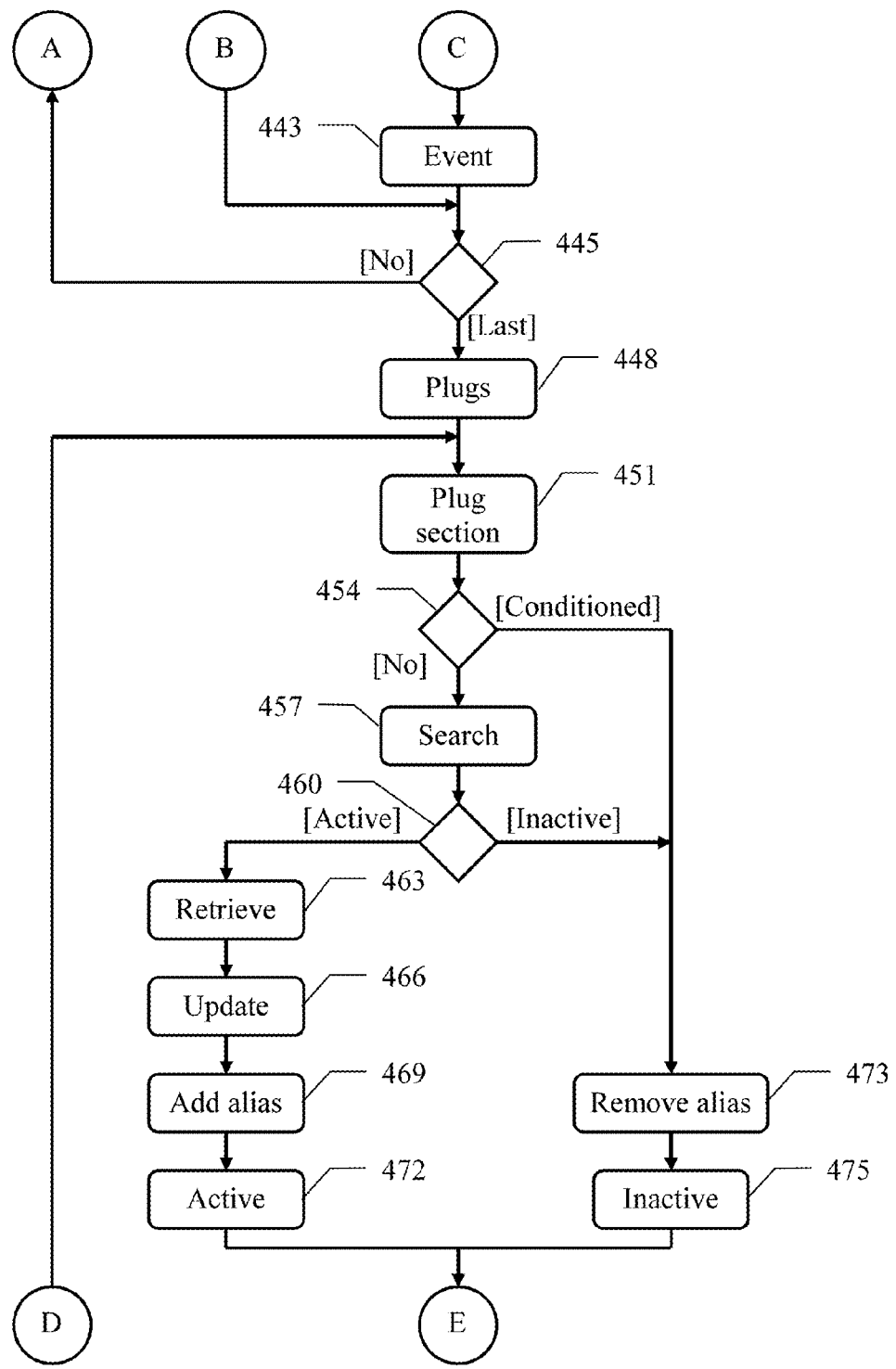
Figure 4C:
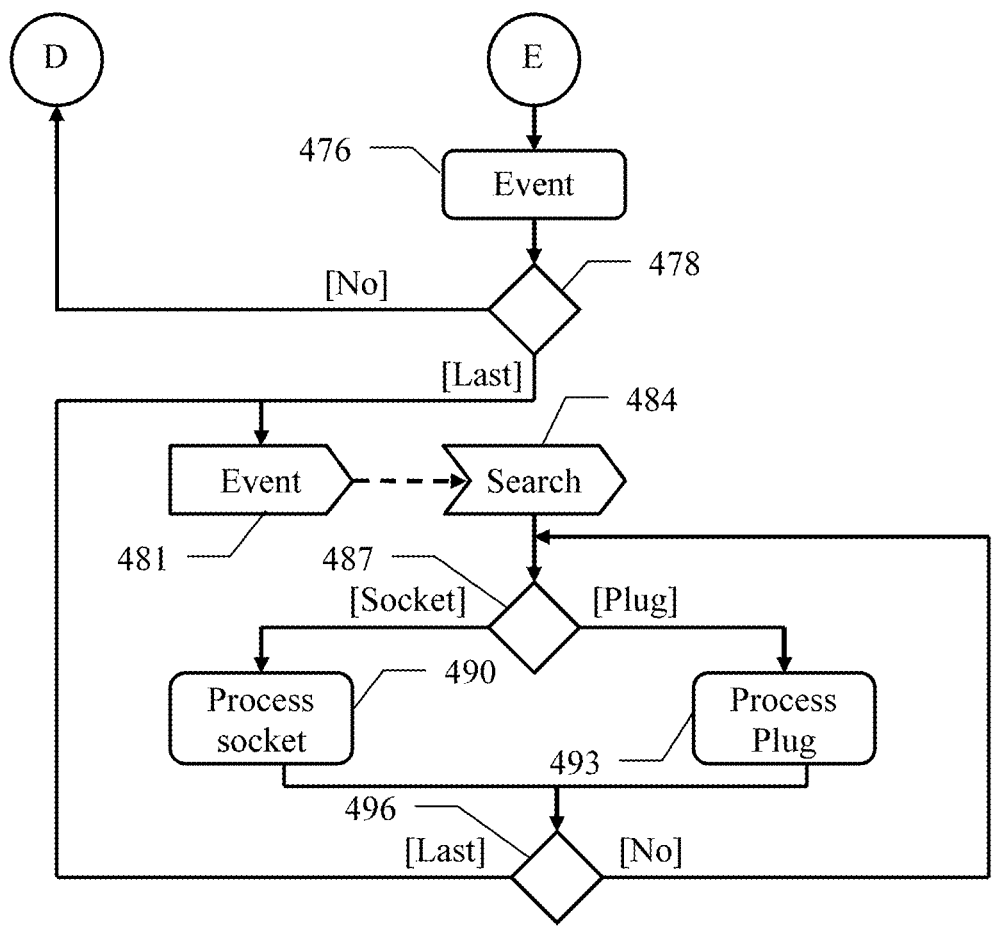

An activity diagram describing the flow of activities relating to an implementation of the solution according to an embodiment of the invention is shown in the FIG. 4A-FIG. 4C. In this respect, each block in the diagram may represent a module, segment or portion of code, which comprises one or more executable instructions for implementing the specified logical function (or more).

Particularly, an exemplary process that may be used to control the deployment of software images in the above-described implementation of the present invention is represented with a method 400. The method 400 begins at the black start circle 403, and then passes to block 406 as soon as a generic software image has to be deployed onto the computing system. In response thereto, the corresponding computing machine is instantiated at block 409 from this software image into the target environment. The computing machine comprises the operating system and the application programs required for its operation; moreover, it comprises the connection engine and the connection adapter (created during the building of the software image) for managing its connections to the other computing machines.

For example, the connection adapter may be stored in a corresponding XML file (for example, defined by the tag <ConnectionAdapter>). The XML file comprises an element for each connection entry (for example, defined by the tag <ConnectionEntry>). The connection entry comprises an element storing a connection identifier for logically identifying the connection (for example, defined by the tag <ConnectionEntryID>).

The connection entry then comprises an element for its socket section (for example, defined by the tag <SocketSection>). The socket section comprises an element storing the machine identifier of the computing machine playing the socket role in the connection (for example, defined by the tag <SocketID>). The socket section then comprises an element for its connection parameters (for example, defined by the tag <ConnectionParameters>). Particularly, an element for each connection parameter (for example, defined by the tag <ConnectionParameter>) comprises an element storing its name (for example, defined by the tag <ParameterName>) and an element storing its value (for example, defined by the tag <ParameterValue>). In the solution according to an embodiment of the invention, a connection parameter for the old access identifier (for example, with the value "Old") and a connection parameter for the new access identifier (for example, with the value "New") are provided.

The connection entry also comprises an element for its plug section (for example, defined by the tag <PlugSection>). The plug section comprises an element storing the machine identifier of the computing machine playing the plug role in the connection (for example, defined by the tag <PlugID>). The plug section then comprises an element for its connection actions (for example, defined by the tag <ConnectionActions>). Particularly, an element for each connection action (for example, defined by the tag <ConnectionAction>) comprises an element storing an indication of a command to be invoked (for example, defined by the tag <Command>) and an element storing the name of each connection parameter (whose value is defined in the socket section) to be passed to the command (for example, defined by the tag <ParameterName>). In the solution according to an embodiment of the invention, the connection adapter has a connection action that adds an internal alias for the old access identifier pointing to the new access identifier and a connection action that removes this alias, both of them being passed the values of the old access identifier and the new access identifier; for example, the above-mentioned commands are corresponding APIs (Application Command Interface) of the operating system.

Moreover, either the socket section or the plug section may comprise an element (for example, defined by the tag <Condition>) for a condition to be satisfied for processing the corresponding (socket or plug) section. For each condition, an element stores its type (for example, defined by the tag <ConditionType>) and an element stores its value (for example, defined by the tag <ConditionValue>). For example, the condition may indicate that the socket/plug section may be processed only after one or more other sockets and/or plugs have been activated.

For example, in the above-described scenario the connection adapter of the computing machines MachineID1 and MachineID2 for a connection Connection12 (without any condition) from the computing machine MachineID2 to the computing machine MachineID1, having the old access identifier AccessIDb1 (wherein the commands "addCommand" and "removeCommand" are invoked for adding and removing, respectively, the internal alias) is:

```
<ConnectionAdapter>
    <ConnectionEntry>
        <ConnectionEntryID>Connection12<ConnectionEntryID>
        <SocketSection>
            <SocketID>MachineID1<SocketID>
            <ConnectionParameters>
                <ConnectionParameter>
                    <ParameterName>Old<ParameterName>
                    <ParameterValue>AccessIDb1<ParameterValue>
                    <ParameterName>New<ParameterName>
                    <ParameterValue><ParameterValue>
                <ConnectionParameter>
            <ConnectionParameters>
        <SocketSection>
        <PlugSection>
            <PlugID>MachineID2<PlugID>
            <ConnectionActions>
                <ConnectionAction>
                    <Command>addCommand<Command>
                    <ParameterName>Old<ParameterName>
                    <ParameterName>New<ParameterName>
                <ConnectionAction>
                    <Command>removeCommand<Command>
                    <ParameterName>Old<ParameterName>
                    <ParameterName>New<ParameterName>
                <ConnectionAction>
            <ConnectionActions>
```

-continued

```
<PlugSection>
    <ConnectionEntry>
<ConnectionAdapter>
```

The computing machine is reconfigured at block 412 for working correctly in the target environment; particularly, this causes the computing machine to have a new access identifier (which replaces its old access identifier). In this phase, the computing machine is also reactivated (if necessary). Indeed, the computing machine may comprise (static) application programs that are listening for inbound communications from the corresponding plugs on the old access identifier of the computing machine embedded therein (for example, an old socket defined by its old IP address and a selected port number)—unlike (dynamic) application programs that are listening on the new access identifier of the computing machine that is fetched at run-time. A possible technique is to use a watchdog of the computing machine which discovers the static application programs (by listening on any sockets comprising an internal alias for the old IP address); a broker of the computing machine then, may listen on the new access identifier on behalf of each static application program (i.e., on a corresponding new socket defined by the new IP address and the same port number) and forward any inbound communication to the static application program. In addition or as an alternative to this possible technique, the (static and dynamic) application programs may retrieve the required IP address by submitting a mapping query to a Domain Name Server (DNS) passing the (old or new) hostname of the computing machine. In this case, a proxy name server of the computing machine intercepts any mapping query and replaces its old hostname with the new hostname, so that the DNS always returns the new IP address.

The computing machine is turned-on at block 415; this causes the automatic start of the connection engine. Continuing to block 418, the connection adapter stored in the computing machine is read.

The connections wherein the computing machine plays the socket role are determined at block 421 from the connection adapter (i.e., wherein the tag <SocketID> stores its machine identifier in the example at issue). A loop is now performed for processing each one of the corresponding socket sections (starting from the first one). The loop begins at block 424, wherein the (current) socket section is extracted from the connection adapter. A test is made at block 427 to verify whether the socket section depends on one or more conditions. If the socket section has no condition or all of them are satisfied, the new access identifier of the computing machine is fetched at block 430 from the operating system (by invoking a corresponding API); in this way, the new access identifier is determined dynamically at run-time (without requiring any manual operation). A test is then made at block 433 to verify whether the value of the new access identifier being fetched is different from the one being stored in the socket section (which is always true at the beginning when the socket section does not store any new access identifier). If the fetched value of the new access identifier is different from the stored value thereof, the socket section is updated accordingly at block 436.

For example, in the above-described scenario the socket section of the connection Connection12 on the MachineID1 (having the new access identifier AccessIDt1) becomes:

```
<SocketSection>
    <SocketID>MachineID1<SocketID>
    <ConnectionParameters>
        <ConnectionParameter>
            <ParameterName>Old<ParameterName>
            <ParameterValue>AccessIDb1<ParameterValue>
            <ParameterName>New<ParameterName>
            <ParameterValue>AccessIDt1<ParameterValue>
        <ConnectionParameter>
    <ConnectionParameters>
<SocketSection>
```

Corresponding socket information is published into the connection registry at block 439. Particularly, an entry for the socket is added (if not available yet) or it is updated (otherwise); this entry indicates the association between the old access identifier and the new access identifier, and the status of the socket as active.

For example, the connection registry may be stored in a corresponding file with rows formatted as key/value pairs. For each computing machine, the file comprises a row storing its machine identifier (for example, with key "MachineID"). For each connection involving the computing machine, the file then comprises a row storing its connection identifier (for example, with key "ConnectionID"), a row storing its role in the connection (for example, with key "Role" and values "Socket" or "Plug"), and a row storing its status (for example, with key "Status" and values "Active" or "Inactive"). If the computing machine plays the socket role in the connection, the file further comprises a row storing its old access identifier (for example, with key "Old") and a row storing its new access identifier (for example, with key "New"). The connection registry may be accessed automatically, for example, when a service managing it supports the Service Location Protocol (SLP or srvloc). In this case, the connection engine broadcasts an SLP query for searching the connection registry (as defined by a corresponding abstract service type), combined with a query for the entry to be added/updated.

For example, in the above-described scenario the connection registry becomes:
MachineID: MachineID1
ConnectionID: Connection12
Role: Socket
Status: Active
Old: AccessIDb1
New: AccessIDt1

Referring back to the block 427, if the socket section has one or more conditions that are not satisfied yet, the flow of activity descends into block 442. In this phase, corresponding socket information is published into the connection registry; particularly, an entry for the socket is added as above (if not available yet) or it is updated (otherwise), but in any case with the indication that the socket is inactive.

For example, in the above-described scenario the connection registry becomes:
MachineID: MachineID1
ConnectionID: Connection12
Role: Socket
Status: Inactive
Old: -
New: -

The flow of activity merges again at block 443 from either the block 439 or the block 442. In this phase, a corresponding connection event (indicating the activation or the inactivation, respectively, of the socket) is generated by notifying the event manager accordingly.

The flow of activity continues to block 445; the same point is also reached directly from the block 433 when the fetched value of the new access identifier is equal to the stored value thereof. In any case, a test is now made to verify whether all the connections wherein the computing machine plays the socket role have been processed. If not, the flow of activity returns to the block 424 for repeating the same operations described above on a next one of these connections.

Conversely, the loop is exited by descending from the block 445 into block 448. At this point, the connections wherein the computing machine plays the plug role are determined from the connection adapter (i.e., wherein the tag <PlugID> stores its machine identifier in the example at issue). Another loop is now performed for processing each one of the corresponding plug sections (starting from the first one). The loop begins at block 451, wherein the (current) plug section is extracted from the connection adapter. A test is made at block 454 to verify whether the plug section depends on one or more conditions. If the plug section has no condition or all of them are satisfied, the entry for the corresponding socket (as identified by the connection identifier of the connection of the plug section and the machine identifier of its socket section) is searched in the connection registry at block 457. The flow of activity branches at block 460 according to the result of this search. If the entry for the socket has been found in the connection registry and its status is active, the new access identifier of the socket is retrieved from the connection registry at block 463.

For example, if the connection registry is accessed automatically as above, the connection engine again broadcasts the same SLP query for searching the connection registry (as defined by the corresponding abstract service type), combined with a different query for retrieving the entry of the socket (as identified by its machine identifier and connection identifier). In response thereto, the service managing the connection registry returns the entry of the socket (in the form of name/value pairs) if found, or an error code otherwise. In the scenario at issue, the SLP query for the entry of the socket (comprising the values "MachineID1,Connection12") would return (Status: Active, New: AccessIDt1) after its activation.

The socket section is updated accordingly at block 466 (by storing the new access identifier therein as above). The connection action for adding an internal alias for the old access identifier pointing to the new access identifier is executed at block 469 by invoking the corresponding command retrieved from the plug section passing the values retrieved from the socket section (i.e., "addCommand(AccessIDb1,AccessIDt1)" in the example at issue). Corresponding plug information is published into the connection registry at block 472. Particularly, an entry for the plug is added (if not available yet) or it is updated (otherwise); the entry indicates the socket which the plug is connected to and the status of the plug as active.

For example, for each plug the file of the connection registry may comprise (in addition to the rows storing its machine identifier, connection identifier, role and status) a row storing the machine identifier of the computing machine which it is connected to (for example, with key "ConnectedTo"). For example, in the above-described scenario the connection registry becomes:
MachineID: MachineID1
ConnectionID: Connection12
Role: Socket
Status: Active
Old: AccessIDb1
New: AccessIDt1
MachineID: MachineID2
ConnectionID: Connection12
Role: Plug
Status: Active
ConnectedTo: AccessIDt1

Referring back to the block 460, if no entry for the socket has been found in the connection registry or it has been found but its status is inactive, the flow of activity descends into block 473; the same point is also reached form the block 454 when the plug section has one or more conditions that are not satisfied yet. In this phase, the connection action for removing the internal alias for the old access identifier pointing to the new access identifier (if any) is executed at block 475 by invoking the corresponding command retrieved from the plug section passing the values retrieved from the socket section (i.e., "removeCommand(AccessIDb1,AccessIDt1)" in the example at issue). Corresponding plug information is published into the connection registry at block 475; particularly, an entry for the plug is added as above (if not available yet) or it is updated (otherwise), but in any case with the indication that the plug is inactive.

For example, in the above-described scenario (assuming that the socket is inactive) the connection registry becomes:
MachineID: MachineID1
ConnectionID: Connection12
Role: Socket
Status: Inactive
Old: -
New: -
MachineID: MachineID2
ConnectionID: Connection12
Role: Plug
Status: Inactive
ConnectedTo: -

The flow of activity merges again at block 476 from either the block 472 or the block 475. In this phase, a corresponding connection event (indicating the activation or the inactivation, respectively, of the plug) is generated by notifying the event manager accordingly. A test is made at block 478 to verify whether all the connections wherein the computing machine plays the plug role have been processed. If not, the flow of activity returns to the block 451 for repeating the same operations described above on a next one of these connections.

Conversely, the loop is exited by descending from the block 478 into block 481. At this point, a waiting condition is entered for the notification of any connection event (from the event manager); for example, the connection events may indicate the above-described activation/inactivation of a socket/plug, or the removal of a socket/plug (either temporally when the corresponding computing machine becomes unavailable or permanently when it is dismissed). As soon as the notification of a connection event is received, the flow of activity passes to block 484; in this phase, the socket/plug sections of the connections that may be affected by the connection event are searched in the connection adapter. For example, any socket/plug section is affected by the connection event when it changes the fulfillment of a condition thereof (from non-satisfied to satisfied, or vice-versa); moreover, any plug section is affected by the connection event when it relates to the corresponding socket (for example, indicating its activation/inactivation or removal).

A loop is now performed for each one of these connections (starting from the first one). The loop begins at block 487, wherein the flow of activity branches according to the role that is played by the computing machine in the (current) connection. If the computing machine plays the socket role, the socket section of the connection is processed again at block 490 (by repeating the same operations of the blocks

424-443); conversely, if the computing machine plays the plug role, the plug section of the connection is processed again at block 493 (by repeating the same operations of the blocks 451-476). For example, a connection event that makes all the conditions of a socket/plug section satisfied allows its processing. Moreover, a connection event that indicates the activation of a socket allows the activation of the corresponding plug; conversely, a connection event that indicates the inactivation of a socket causes the inactivation of the corresponding plug.

The flow of activity continues to block 496 from either the block 490 or the block 493. In any case, a test is now made to verify whether all the connections that may be affected by the connection event have been processed. If not, the flow of activity returns to the block 487 for repeating the same operations described above on a next one of these connections. Otherwise, the flow of activity returns to the block 481 waiting for the notification of another connection event.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the present invention provides a method for deploying software images onto a computing system. The method comprises the following steps. A computing machine is instantiated onto the computing system from a corresponding software image; the computing machine has an old access identifier and is connected to the old access identifier of at least one further computing machine in the software image. The computing machine is configured to have a new access identifier. The new access identifier of each further computing machine is retrieved from a manifested association between the old access identifier and the new access identifier thereof. Each outbound communication from the computing machine to the old access identifier of each further computing machine is redirected to the new access identifier thereof.

However, the method may be applied to the deployment of any software images, even not comprised in virtual appliances (for example, only comprising an operating system), onto any computing system (see below). The computing machine may be of any type (either of the physical or virtual type). The access identifier may be any value that is used to access the computing machine (for example, its hostname, IP address and/or port number). The computing machine may be configured in any way (so as to have a new access identifier), for example, by setting it manually or by changing an accessing scheme (such as from a static addressing scheme wherein the old IP address is pre-assigned to a dynamic addressing scheme wherein the new IP address is assigned automatically whenever the computing machine boots by a Dynamic Host Configuration Protocol, or DHCP). The computing machine may be connected in any way to any number of further computing machines for any purpose (for example, with each application program that is connected to one or more server component, peer component, client component or web service to cooperate for achieving a common goal and/or for exchanging information). The new access identifier of each further computing machine may be retrieved in any way from any manifested association and each outbound communication may be redirected in any way (see below).

In an embodiment of the invention, the method further comprises the step of manifesting the association between the old access identifier and the new access identifier of the computing machine only if the computing machine is connected by at least one still further computing machine.

However, the association may be manifested by any entity (for example, by the deployment server for all the computing machines).

In an embodiment of the invention, the step of manifesting the association between the old access identifier and the new access identifier of the computing machine includes publishing the association between the old access identifier and the new access identifier of the computing machine into a shared registry; the step of retrieving the new access identifier of each further computing machine includes retrieving the new access identifier associated with the old access identifier of the further computing machine from the shared registry.

However, the shared registry may be of any type (for example, a table). Moreover, the association may be manifested and retrieved in another way—even without any shared registry; for example, in a different implementation each further computing machine simply exposes the corresponding associations, which are retrieved directly from it by the computing machine (such as via the SLP).

In an embodiment of the invention, the step of redirecting each outbound communication from the computing machine to the old access identifier of each further computing machine to the new access identifier thereof includes adding an internal alias for the old access identifier of the further computing machine pointing to the new access identifier thereof.

However, the outbound communication may be redirected in another way—even without the addition of any internal alias (for example, by wrapping the communication module).

In an embodiment of the invention, the steps of retrieving the new access identifier of each further computing machine and redirecting each outbound communication include processing a plug section for each connection wherein the computing machine plays a plug role connecting to a corresponding one of said at least one further computing machine; the plug section comprises an indication of an activation action and of a set of connection parameters, which are the old access identifier and the new access identifier. The processing of the plug section includes retrieving the connection parameters being indicated in the plug section, and executing (in response to a successful retrieval of the connection parameters) the activation action being indicated in the plug section by passing the connection parameters for causing an activation of the corresponding redirection.

However, the plug section may comprise additional information—for example, an identifier and a description of the plug, and for each activation action an identifier and a description of the activation action, its type (such as local or remote script, web service and the like) and its triggering event (for example, deployment, turn-on, and the like). The processing of the plug section may comprise different, additional or alternative operations (for example, disabling the connection functionality during it, without any conditions, based on predefined policies or constraints).

In an embodiment of the invention, each plug section further comprises an indication of an inactivation action; the step of processing a plug section further includes executing (in response to an unsuccessful retrieval of the connection parameters), the inactivation action being indicated in the plug section by passing the connection parameters for causing an inactivation of the corresponding redirection.

However, the plug section may comprise additional information for each inactivation action as above. Moreover, the unsuccessful retrieval of the connection parameters may be determined in any way (for example, when they are not available in the shared registry, even without any status indicator, or when they are not received within a predefined time-out).

In an embodiment of the invention, the method further comprises the step of executing the inactivation action being indicated in the plug section by passing the connection parameters in response to a socket inactivation event indicative of an inactivation of the corresponding further computing machine.

However, the socket inactivation event may be generated in any way (for example, when the further computing machine becomes overloaded).

In an embodiment of the invention, the step of manifesting the association between the old access identifier and the new access identifier of the computing machine includes processing a socket section for each connection wherein the computing machine plays a socket role being connected by at least part of said at least one still further computing machine; the socket section comprises the indication of the connection parameters and the old access identifier being assigned to the corresponding connection parameter. The processing of the socket section includes assigning the new access identifier to the corresponding connection parameter, and manifesting the connection parameters.

However, the socket section may comprise additional information as above. The processing of the socket section may comprise different, additional or alternative operations (for example, manifesting its environment, type, status, user and the like).

In an embodiment of the invention, the step of processing a socket section further includes fetching the new access identifier of the computing machine.

However, the new access identifier may be assigned to the corresponding connection parameter in another way (for example, by extracting it from the plug section wherein it is defined statically).

In an embodiment of the invention, the step of processing a socket section further includes generating a socket activation event in response to the manifesting of the corresponding connection parameters; the method further comprises the step of executing the processing of each plug section in response to the corresponding socket activation event.

However, the plug section may be processed in response to different, additional or alternative events (for example, an update of the corresponding further computing machine).

In an embodiment of the invention, the method further comprises the step of reading a connection adapter comprised in the software image; for each connection involving the computing machine, the connection adapter includes the corresponding plug section, the corresponding socket section and an indication of the role played by the computing machine in the connection.

However, the connection adapter may be of any type (for example, a table) and provided in another way (for example, downloaded from a corresponding repository). Moreover, the connection adapter may comprise different, additional or alternative information; for example, in another implementation the role of the computing machine in each connection is retrieved from the shared registry.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

Another embodiment of the invention provides a computer program comprising code means for causing a computing machine to perform the steps of the above-described method when the computer program is executed on the computing machine.

Another embodiment of the invention provides a computer program product comprising a non-transitory computer readable medium embodying a computer program, the computer program comprising code means directly loadable into a working memory of a computing machine thereby configuring the computing machine to perform the same method.

However, the computer program may be implemented by a dedicated module (such as the connection engine) that is injected into each software image before its deployment or it is downloaded onto each computing machine after its instantiation, by a common module running on a dedicated computing machine and capable of managing all the other computing machines, or by a remote service.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Another embodiment of the invention provides a system, which comprises means configured for performing the steps of the above-described method.

However, the system may be implemented in any way (for example, with a distributed architecture based on local, wide area, global, cellular or satellite network, and exploiting any type of wired and/or wireless connections); in any case, the system may comprise similar elements (such as cache memories temporarily storing the programs or parts thereof), and it may be replaced by any code execution entity, either based on one ore more physical machines, virtual machines, or with any combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries.

What is claimed is:

1. A method for deploying software images onto a computing system, the method comprising:
instantiating, by one or more processors, a first computing machine from a software image, wherein the first computing machine is instantiated onto a computing system, wherein the first computing machine has a first old access identifier, wherein the first computing machine is initially connected to a second computing machine in the computing system via a second old access identifier for the second computing machine, and wherein the second computing machine has been instantiated from the software image;
reconfiguring, by one or more processors, the second computing machine to have a new access identifier, wherein said reconfiguring is achieved by:
retrieving the new access identifier for said second computing machine, and
associating the new access identifier with the second old access identifier; and
redirecting each outbound communication, from the first old access identifier to the second old access identifier, to the new access identifier of the second computing machine.

2. The method of claim 1, further comprising:
manifesting an association between the second old access identifier and the new access identifier only if the second computing machine is connected to a third computing machine that has been instantiated from the software image and deployed onto the computing system.

3. The method of claim 2, further comprising:
publishing the association between the second old access identifier and the new access identifier of the second computing machine into a shared registry, wherein the shared registry is shared by the first computing machine and the second computing machine; and
retrieving the new access identifier associated with the second old access identifier of the second computing machine from the shared registry.

4. The method of claim 2, further comprising:
processing a plug section for each connection to the second computing machine, wherein the second computing machine plays a plug role to connect to another computing machine, wherein the plug section comprises an indication of an activation action and of a set of connection parameters for the second old access identifier and the new access identifier, and wherein the processing of the plug section includes:

retrieving the connection parameters indicated in the plug section, and in response to a successful retrieval of the connection parameters, executing the activation action being indicated in the plug section by passing the connection parameters in order to activate a redirection of an outbound communication to the new access identifier.

5. The method of claim 4, wherein each plug section further comprises an indication of an inactivation action, and wherein the method further comprises:

in response to an unsuccessful retrieval of the connection parameters, executing the inactivation action being indicated in the plug section by passing the connection parameters to cause an inactivation of the corresponding redirection.

6. The method of claim 5, further comprising:

in response to a socket inactivation event indicating an inactivation of the second computing machine, executing the inactivation action being indicated in the plug section by passing the connection parameters to the second computing machine.

7. The method of claim 6, further comprising:

processing a socket section for each connection to the second computing machine, wherein the second computing machine plays a socket role being connected by at least part of said second computing machine, wherein the socket section comprises an indication of the connection parameters and the second old access identifier, and wherein processing of the socket section includes:

assigning the new access identifier to a corresponding connection parameter, and manifesting the corresponding connection parameter by publishing an association between the second old access identifier and the new access identifier of the second computing machine into a shared registry, wherein the shared registry is shared by the first computing machine and the second computing machine.

8. The method of claim 7, further comprising:

fetching the new access identifier of the second computing machine;

generating a socket activation event in response to the manifesting of the corresponding connection parameters; and executing the processing of each plug section in response to a corresponding socket activation event.

9. The method of claim 8, further comprising:

reading a connection adapter for each connection involving the second computing machine, wherein the connection adapter includes a corresponding plug section, a corresponding socket section, and an indication of a role played by the second computing machine in a connection to the first computing machine.

10. The method of claim 1, further comprising:

adding an internal alias for the second old access identifier of the second computing machine, wherein the internal alias points to the new access identifier.

11. A computer program product for deploying software images onto a computing system, the computer program product comprising a non-transitory computer readable storage medium having program code embodied therewith, the program code being readable and executable by a processor to perform a method comprising:

instantiating a first computing machine from a software image, wherein the first computing machine is instantiated onto a computing system, wherein the first computing machine has a first old access identifier, wherein the first computing machine is initially connected to a second computing machine in the computing system via a second old access identifier for the second computing machine, and wherein the second computing machine has been instantiated from the software image;

reconfiguring the second computing machine to have a new access identifier, wherein said reconfiguring is achieved by: retrieving the new access identifier for said second computing machine, and associating the new access identifier with the second old access identifier; and redirecting each outbound communication, from the first old access identifier to the second old access identifier, to the new access identifier of the second computing machine.

12. The computer program product of claim 11, wherein the method further comprises:

manifesting an association between the second old access identifier and the new access identifier only if the second computing machine is connected to a third computing machine that has been instantiated from the software image and deployed onto the computing system.

13. The computer program product of claim 12, wherein the method further comprises:

publishing the association between the second old access identifier and the new access identifier of the second computing machine into a shared registry, wherein the shared registry is shared by the first computing machine and the second computing machine; and retrieving the new access identifier associated with the second old access identifier of the second computing machine from the shared registry.

14. The computer program product of claim 12, wherein the method further comprises processing a plug section for each connection to the second computing machine, wherein the second computing machine plays a plug role to connect to another computing machine, wherein the plug section comprises an indication of an activation action and of a set of connection parameters for the second old access identifier and the new access identifier, and wherein the processing of the plug section includes retrieving the connection parameters indicated m the plug section, and m response to a successful retrieval of the connection parameters, executing the activation action being indicated in the plug section by passing the connection parameters m order to activate a redirection of an outbound communication to the new access identifier.

15. The computer program product of claim 11, wherein the method further comprises:

adding an internal alias for the second old access identifier of the second computing machine, wherein the internal alias points to the new access identifier.

16. A computer system comprising:

a processor, a computer readable memory, and a computer readable storage medium;

first program instructions to instantiate a first computing machine from a software image, wherein the first computing machine is instantiated onto a computing system, wherein the first computing machine has a first old access identifier, wherein the first computing machine is initially connected to a second computing machine in the computing system via a second old access identifier for the second computing machine, and wherein the second computing machine has been instantiated from the software image;

second program instructions to reconfigure the second computing machine to have a new access identifier, wherein reconfiguring the second computing machine is achieved by:

retrieving the new access identifier for said second computing machine, and associating the new access identifier with the second old access identifier; and third program instructions to redirect each outbound communication, from the first old access identifier to the second old access identifier, to the new access identifier of the second computing machine; and wherein said first, second, and third program instructions are stored on said computer readable storage medium for execution by said processor via said computer readable memory.

17. The computer system of claim 16, further comprising:

fourth program instructions to manifest an association between the second old access identifier and the new access identifier only if the second computing machine is connected to a third computing machine that has been instantiated from the software image and deployed onto the computing system; and wherein said fourth program instructions are stored on said computer readable storage medium for execution by said processor via said computer readable memory.

18. The computer system of claim 17, further comprising:

fifth program instructions to publish the association between the second old access identifier and the new access identifier of the second computing machine into a shared registry, wherein the shared registry is shared by the first computing machine and the second computing machine; and sixth program instructions to retrieve the new access identifier associated with the second old access identifier of the second computing machine from the shared registry; and wherein said fifth and sixth program instructions are stored on said computer readable storage medium for execution by said processor via said computer readable memory.

19. The computer system of claim 17, further comprising:

fifth program instructions to process a plug section for each connection to the second computing machine, wherein the second computing machine plays a plug role to connect to another computing machine, wherein the plug section comprises an indication of an activation action and of a set of connection parameters for the second old access identifier and the new access identifier, and wherein the processing of the plug section includes:

retrieving the connection parameters indicated in the plug section, and in response to a successful retrieval of the connection parameters, executing the activation action being indicated in the plug section by passing the connection parameters in order to activate a redirection of an outbound communication to the new access identifier; and wherein said fifth program instructions are stored on said computer readable storage medium for execution by said processor via said computer readable memory.

20. The computer system of claim 16, further comprising:

fourth program instructions to add an internal alias for the second old access identifier of the second computing machine, wherein the internal alias points to the new access identifier; and wherein said fourth program instructions are stored on said computer readable storage medium for execution by said processor via said computer readable memory.

\* \* \* \* \*